(12) United States Patent
Yockey

(10) Patent No.: US 6,370,652 B1
(45) Date of Patent: Apr. 9, 2002

(54) CONTROL OF I.C.'S HAVING DIFFERENT COMMAND PROTOCOLS VIA COMMON COMMUNICATION LINES FROM A CONTROLLING I.C. ON A DIFFERENT CIRCUIT BOARD

(75) Inventor: Karienne Ann Yockey, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/337,481

(22) Filed: Jun. 21, 1999

(51) Int. Cl.$^7$ .................................................. G06F 1/04
(52) U.S. Cl. ........................ 713/401; 713/400; 713/500
(58) Field of Search ................................ 713/400, 401, 713/500–503, 600, 601; 710/105, 106, 56, 61

(56) References Cited

U.S. PATENT DOCUMENTS

| | | |
|---|---|---|
| 4,149,151 A | 4/1979 | Nagae et al. |
| 4,225,847 A | 9/1980 | Masuda et al. |
| 4,639,890 A | 1/1987 | Heilveil et al. |
| 4,683,530 A | 7/1987 | Quatse |
| 4,920,511 A | 4/1990 | Brier et al. |
| 5,606,711 A | 2/1997 | Swenson et al. |
| 5,619,722 A | 4/1997 | Lovrenich |

FOREIGN PATENT DOCUMENTS

JP          5-91146      * 4/1993

* cited by examiner

Primary Examiner—Thomas Lee
Assistant Examiner—Ilwoo Park
(74) Attorney, Agent, or Firm—Larry I. Shelton

(57) ABSTRACT

A circuit (100) in which two I.C.'s (102, 104) are under control of a single microcontroller that issues operating commands to the two I.C.'s via shared communication lines, including a clock line, a serial data line, and a chip enable line. The two I.C.'s use differing communication protocols. For example, a first I.C. uses a common shift register protocol and has a serial data output while a second I.C. uses a $C^2B$ communication protocol. The chip enable line provides chip enable signal pulses (120) that are suitable for the chip enable input of the second I.C. (104). An interface circuit (106) on the same board that contains the two I.C.'s, interfaces the chip enable line to a strobe input of the first I.C. (102) to create strobe signal pulses suitable for the protocol of the first I.C. (102). The interface circuit performs timing and voltage limiting functions. Data enters the second I.C. only after having been clocked through the first I.C.

15 Claims, 2 Drawing Sheets

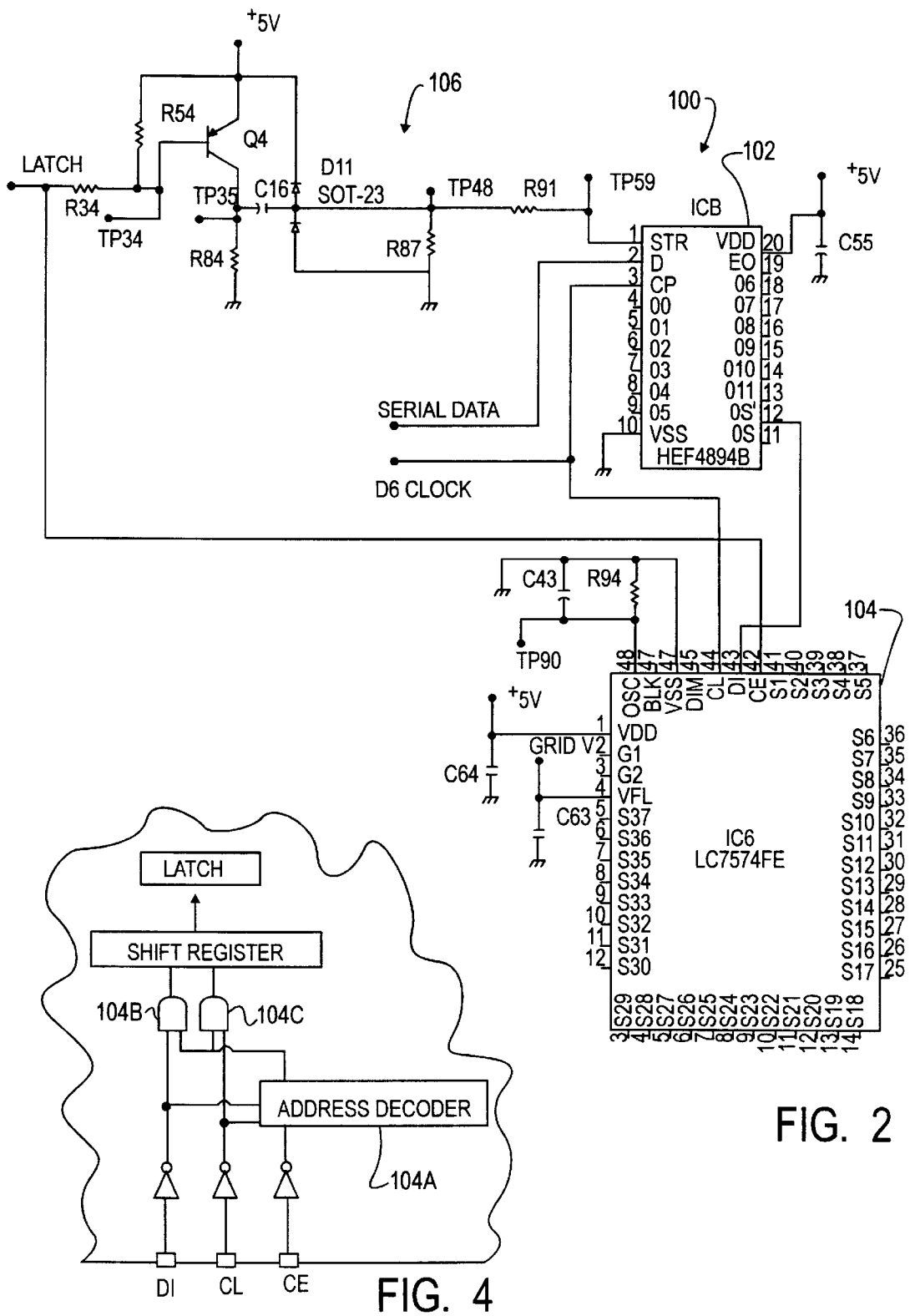

CONTROL OF I.C.'S HAVING DIFFERENT COMMAND PROTOCOLS VIA COMMON COMMUNICATION LINES FROM A CONTROLLING I.C. ON A DIFFERENT CIRCUIT BOARD

BACKGROUND OF THE INVENTION

1. Field of the Invention

This invention relates generally to microprocessor control of plural integrated circuits (I.C.'s). More particularly, the invention relates to communication of data and control signals from a microprocessor to two separate I.C.'s that have different command protocols using shared output lines from the microprocessor.

2. Background Information

Microprocessors typically control many different peripheral devices in any particular application. Each of a plurality of individual I.C.'s that are under the common control of a microprocessor typically may have a unique command protocol requiring its own unique set of communication lines from the microprocessor. For example, the particular command protocols for operating an HEF4894B shift register I.C. (manufactured by Philips Semiconductor) and an LC7574FE vacuum fluorescent display driver I.C. (manufactured by Sanyo) are not identical; yet both devices may be used as peripherals to a microprocessor or microcontroller within a particular climate control module in an automotive vehicle, for example. When both an HEF4894B I.C. and an LC7574FE I.C. are connected to the same controlling microprocessor that issues commands to the them, prior art systems required each I.C. to have its own unique set of control lines. Additional control lines add cost not only to the microprocessor itself, but also increases circuit board size and cost.

More specifically, an automotive vehicle climate control system may include a control bezel with both indicator LED's and an alphanumeric display. It was desired to use an HEF4894B shift register I.C. to control the LED's and an LC7574FE display driver I.C. to control a vacuum florescent display. While both the HEF4894B I.C. and the LC7574FE I.C. were on a common circuit board, the controlling microprocessor was on a different board. Consequently, the wiring between circuit boards (e.g., a ribbon cable) would have to contain separate sets of lines for the I.C.'s. However, because space was at a premium, it was difficult to physically package the necessary number of wires required for two unique sets of communication lines. Shared lines between the microprocessor and the peripheral I.C.'s could be used if the communication protocols were compatible. However, substitution of different I.C.'s using identical protocols or the design and fabrication of a new ASIC (Application Specific I.C.) to replace the HEF4894B and LC7574FE I.C.'s would not be cost-effective.

SUMMARY OF THE INVENTION

The present invention relates to a solution for enabling plural I.C.'s having different command protocols to be served by a single set of common control lines. A command protocol may, for example, define how serial data is clocked into an I.C. The inventive principles are useful in circuit applications where it is desired to use particular individual I.C.'s because they possess certain functional attributes or performance capabilities, while economizing on the number of control and data lines between the I.C.'s and a controlling microprocessor. It is to be appreciated however that certain general inventive principles may be practiced in various and other circuit applications where such considerations may not be present.

Principles of the present invention will be disclosed with reference to a specific example of a particular circuit application using the two particular I.C.'s mentioned above, namely an HEF4894B I.C. and an LC7574FE I.C. It is also to be appreciated that general inventive principles may be practiced in other circuit applications using other than these two particular I.C.'s or using more that two I.C.'s.

The invention is particularly advantageous in that it reduces the number of microprocessor pins required to control multiple device I.C.'s and it cuts down on corresponding circuit board traces. These advantages become even greater when the invention is used in a circuit where multiple I.C.'s having diverse command protocols are located on a common circuit board which is remote from a circuit board containing a microcontroller that issues operating commands to the I.C.'s via a control line and data via a data line. In the case of the HEF4894B I.C. and the LC7574FE I.C., both I.C.'s are served by a common clock line connected to clock inputs of the I.C.'s. While a single serial data line serves both I.C.'s, data is loaded into the LC7574FE I.C., not by a direct connection of its data input to the single serial data line, but instead through the HEF4894B I.C. A single latch/chip enable line serves both I.C.'s, being connected directly to a chip enable input of the LC7574FE I.C. for delivering a signal, referred to as a chip enable signal, that is suitable for its protocol. An interface circuit on the same board that contains the two I.C.'s, interfaces the latch/chip enable line to a strobe (STR) input of the HEF4894B I.C. to supply a strobe signal suitable for its command protocol. The interface circuit performs voltage inhibit, pulse generation, and voltage limiting functions to allow use of one control line to serve both the chip enable input of the LC7574FE and the STR input of the HEF4894B.

While specific nomenclature appearing on the respective manufacturer's specification sheets for these two I.C.'s may differ, each shows an internal block diagram containing a shift register, a latch, and communication lines, sometimes called control lines, for controlling operation of each device, the control lines including a clock line, a serial data input line, and a chip enable line on the LC7574FE and a strobe line on the HEF4894B. The LC7574FE I.C. is a device whose protocol requires proper addressing of the I.C. before serial data can be loaded. The commercial designation of that protocol is a $C^2B$ protocol, and certain principles of the invention are applicable to I.C.'s that use that protocol, both in addressable or non-addressable form, even if they are not specifically an LC7574FE I.C.

One general aspect of the invention relates to an electronic circuit comprising: discrete first and second integrated circuits each having a respective command protocol diverse from that of the other; the first integrated circuit having a clock input, a strobe input, a data input, a shift register, and an output buffer; the second integrated circuit having a clock input, a chip enable input, a data input, and an address decoder; a clock signal source for supplying a Clock signal comprising clock pulses to the clock inputs of the integrated circuits via a clock line; a data signal source for supplying a Data signal comprising serial data to the data inputs of the integrated circuits via a data line; a chip enable line supplying a Chip enable signal directly to the chip enable input of the second integrated circuit, the Chip enable signal comprising pulses that have leading edges defining change from a first logic state to a second logic state and trailing edges defining change from the second logic state to the first logic state; the second integrated circuit's command protocol allowing serial data at its data input to be clocked in by clock pulses at its clock input when the signal at its chip enable input is in the second logic state and a correct address was loaded into its address decoder prior to the Chip enable signal changing from the first logic state to the second logic state and disallowing serial data at its data input from being clocked in by clock pulses at its clock input either when a signal at its chip enable input is in the first logic state or when a correct address was not loaded into its address decoder prior to the chip enable signal changing from the first logic state to the second logic state; an interface circuit interfacing the chip enable line to the strobe input of the first integrated circuit and supplying to the strobe input of the first integrated circuit a Strobe signal that has a leading edge defining change from the first logic state to the second logic state and a trailing edge defining change from the second logic state to the first logic state; the first integrated circuit's command protocol allowing serial data at its data input to be clocked in by clock pulses at its clock input, when the signal at its strobe input is in the first logic state, allowing data in its shift register to transfer to its output buffer when a signal at its strobe input is in the second logic state, and disallowing data transfer to the output buffer when the signal at its strobe input is in the first logic state thereby latching data at the outputs; and the interface circuit comprising an inhibiting property that in response to change in the Chip enable signal from the first logic state to the second logic state, inhibits change in the signal at the strobe input of the first integrated circuit, and in response to change in the Chip enable signal from the second logic state to the first logic state, initiates a Strobe signal pulse to change the signal being applied at the strobe input from the first logic state to the second logic state, and then after a predefined delay, to revert back to the first logic state.

Another general aspect of the invention relates to an electronic circuit comprising: discrete first and second integrated circuits each having a respective command protocol diverse from that of the other; the first integrated circuit having a clock input, a strobe input, a data input, and a shift register; the second integrated circuit having a clock input, a chip enable input, and a data input; a clock signal source for supplying a clock signal comprising clock pulses to the clock inputs of the integrated circuits; a data signal source for supplying a serial data signal to the data input of the first integrated circuit; a chip enable signal source for supplying to the chip enable input of the second integrated circuit a chip enable signal; an interface circuit interfacing the chip enable signal to the strobe input of the first integrated circuit for supplying to the strobe input a strobe signal derived from the chip enable signal; the shift register having a serial data output at which data that has been clocked through the shift register after entering at the first integrated circuit's data input is serially output; a connection from the serial data output of the shift register to the data input of the second integrated circuit so that data from the data signal source is presented to the second integrated circuit only after having been clocked through the shift register of the first integrated circuit; and in which the first integrated circuit, the second integrated circuit, and the interface circuit are disposed on a common circuit board, the clock signal source, the data signal source, and the chip enable signal source are not disposed on that common circuit board, and a clock signal line connects the clock signal source to the common circuit board, a data signal line connects the data signal source to the common circuit board, and a chip enable signal line connects the chip enable signal source to the common circuit board.

Other general and more specific aspects of the inventive principles will been set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

FIG. 2 is schematic diagram of an electronic circuit embodying principles of the present invention.

FIG. 4 is a fragmentary block diagram of a portion of the circuit of FIG. 2.

DESCRIPTION OF THE PREFERRED EMBODIMENT

Figure 1:
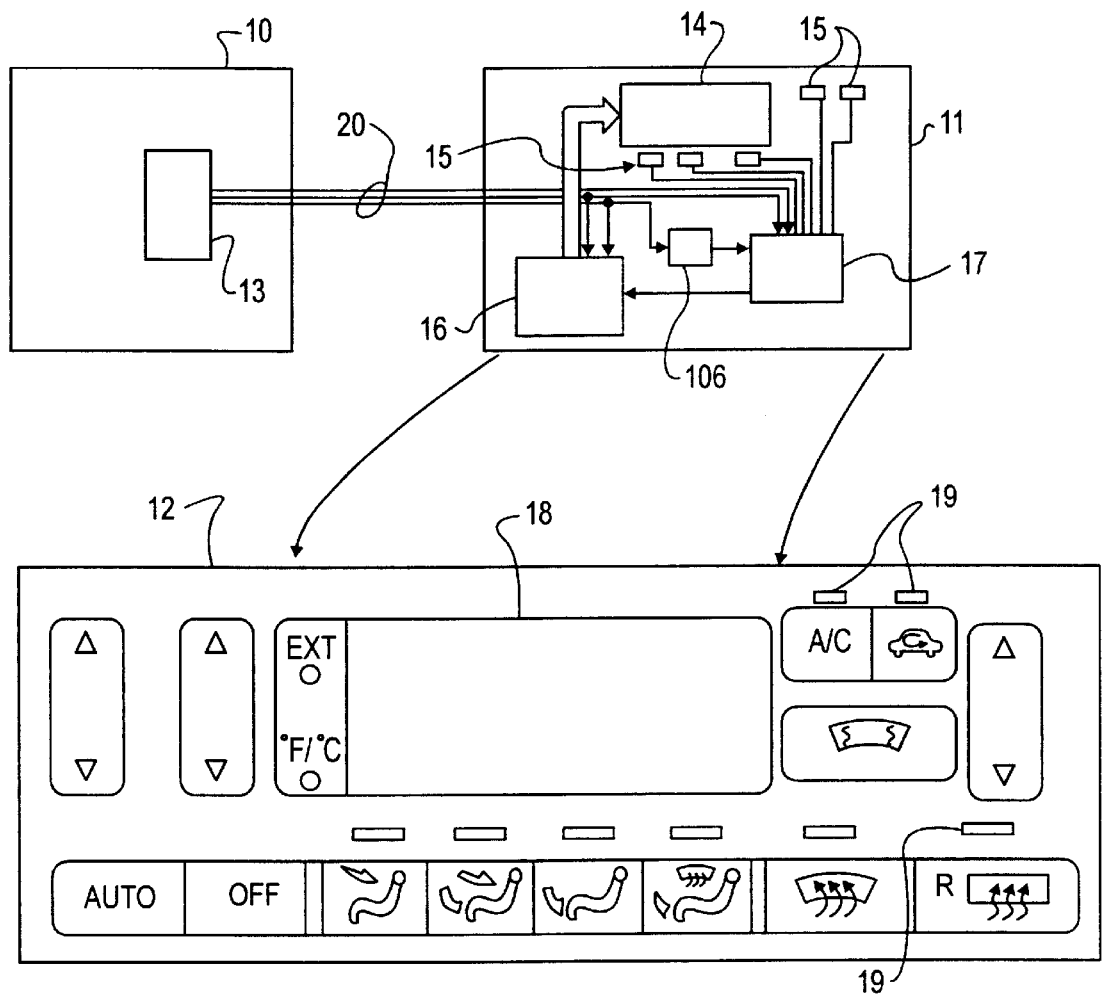
FIG. 1 is a block diagram showing an automotive climate control system.

FIG. 1 shows portions of an electronic climate control system including a main control board 10, a bezel board 11, and a control bezel 12. A microprocessor 13 is located on main board 10. Bezel board 11 includes a vacuum fluorescent display 14, light emitting diodes 15, a display driver 16 for driving display 14, and a shift register 17 for driving LED's 15. Bezel board 11 is mounted to the rear side of bezel 12 so that display 14 is visible through a display window 18 and illumination from LED's 15 is visible through windows 19 when each respective LED is on.

Communication lines 20 interconnect microprocessor 13 with display driver 16 (which is an LC7574FE I.C.) and shift register 17 (which is an HEF4894B I.C.). An interface circuit 106 is connected between one of the lines 20 and the latch input of shift register 17 to modify the chip enable signal from the microprocessor, as is described in greater detail below. The communication line that carries serial data from microprocessor 13 is connected directly to shift register 17 and indirectly to display driver 16 through shift register 17, as also described below. As a result, microprocessor 13 controls both the contents of display 14 and the combination of LED's that are illuminated using only one set of communication lines (e.g., lines for clock, chip enable, and serial data signals) running between boards 10 and 11.

FIG. 2 shows an electronic circuit 100 showing the shift register, display driver, and interface circuit in greater detail. Specifically, these are shown as a first integrated circuit 102, a second integrated circuit 104, and an interface circuit 106, respectively. Both integrated circuits are serial input devices, and each has its own unique protocol.

In the example given by this particular embodiment, integrated circuit 102 is a serial-in, parallel-out type shift register identified by the commercial designation HEF4894B, and integrated circuit 104 is a serial-in display driver identified by the commercial designation LC7574FE. A manufacturer of the former device is Philips Electronics, and a manufacturer of the latter is Sanyo Electric Co., Ltd.

The internal architecture of integrated circuit 102 includes a twelve-stage shift register, a twelve-bit storage register, and an output device comprising twelve open-drain outputs. Terminal pins, designated by the manufacturer by numerals 04–09 and 13–18 are output terminals of the open-drain outputs. Manufacturer-designated terminal pin D is the serial data input to the twelve-bit shift register; terminal pin CP is the clock input to the twelve-bit shift register; terminal pin STR is the strobe input to the twelve-bit storage register; and terminal OS' is a data output of the twelve-bit shift register, namely the twelfth, and most significant, bit position. Power supply connections are via terminal pins VDD and VSS, as shown. Terminal pin EO is an enable output terminal that allows duty cycle control of devices that are driven by the open-drain outputs in a specific circuit usage, to be described later. Terminal pin OS is not used in this specific circuit, and neither it nor terminal pin EO bear directly on fundamental principles of the present invention.

The internal architecture of integrated circuit 104 includes an address decoder, a multiple-stage shift register, a multiple-bit latch, and a multiple-bit driver. Functionally, the multiple-bit latch is a multiple-bit device analogous to the twelve-bit storage register of integrated circuit 102, and the multiple-bit driver is a multiple-bit output device analogous to the open-drain outputs of the output device of integrated circuit 102. In context, reference to a latch, or latch circuit, means a device that performs the same function that is performed by both the multiple-bit latch of integrated circuit 104 and the twelve-bit storage register of integrated circuit 102, either alone or in conjunction with the respective output device. Terminal pins, designated by the manufacturer by numerals S01–S37 are output terminals of the multiple-bit driver of integrated circuit 104. Manufacturer-designated terminal pin DI is the serial data input to integrated circuit 104, terminal pin CL is the clock input, and terminal pin CE is the chip enable input. Power supply connections are via terminal pins VDD and VFL, as shown. A capacitor C43 and a resistor R94 are connected with terminal pins OSC and VSS, as shown, to provide an internal oscillator signal within integrated circuit 104.

Integrated circuit 104 includes additional internal architecture which appears in the manufacturer's specification sheets and may be used in certain specific circuits; but because that additional architecture does not bear directly on principles of the present invention, it is not seen to require discussion herein. One portion of the architecture that pertains to the disclosed example appears in FIG. 4. FIG. 4 shows an address decoder circuit 104A and two gates 104B, 104C arranged between input terminals DI, CL, and CE and the shift register. The I.C. is assigned a particular address, and in order for serial data to enter the shift register, the address decoder circuit must first detect that the I.C. has been correctly addressed by serial data that precedes the data that is to be entered into the shift register.

In integrated circuit 102, binary data at terminal pin D is shifted to the $O_0$ shift register bit position on each rising edge of a clock pulse applied to clock terminal pin CP, with data already in the shift register stages advancing one position. When the signal at the STR input is high, the data in the shift register stages transfers to the storage register, and is output through the output device. The data is latched in the storage register when the signal at the STR input is low, and remains latched or unchanged until the signal at the STR input once again goes high. Hence, it may be desirable not to clock data through the shift register unless the signal at the STR input is low; otherwise, the output drive can change randomly as data is clocked through.

In integrated circuit 104, binary data at the DI input is shifted through the input shift register by first clocking the correct four bit address into the DI input while the CE input is low, then changing the CE input to high to decode the address, and then clocking the remaining data. The data is transferred and latched to the output latch when the CE input once again goes low.

Interface circuit 106 enables use of a single communication line to control both the CE input of integrated circuit 104 and the STR input of integrated circuit 102. By clocking data into integrated circuit 104 through integrated circuit 102, a single communication line supplies data to both integrated circuits. A single communication line controls the CL input of integrated circuit 104 and the CP input of integrated circuit 102.

Circuit 106 comprises individual circuit components including resistors R34, R54, R84, R87, R91, capacitor C16, PNP transistor Q4, and double diode D11, configured as shown. The chip enable line connects to the input of circuit 106 and directly to the CE input of integrated circuit 104. The output of circuit 106 connects directly to terminal STR of integrated circuit 102.

Each of the three communication lines for the Chip enable, Serial Data, and Clock signals delivers a respective control signal that is binary in nature. When the respective signal is relatively lower magnitude voltage, it corresponds to a first logic state, and when the respective signal is relatively higher magnitude voltage, it corresponds to a second logic state. Each signal may be considered to be a pulse signal that goes from the first logic state to the second logic state on the leading edge of a pulse, and from the second logic state to the first logic state on the trailing edge of the pulse.

Figure 3:
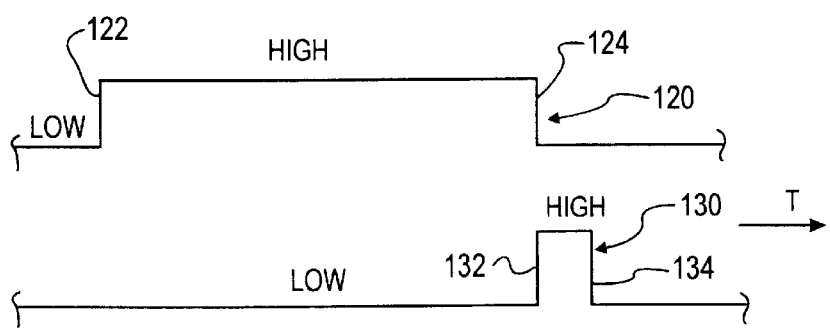
FIG. 3 is a waveform timing diagram related to operation of the circuit shown in FIG. 2.

The operation of circuit 106 may be more easily understood with reference to FIG. 3. The waveform 120 represents the Chip enable signal on the chip enable line that is applied directly to the CE input of integrated circuit 104. FIG. 3 shows a single pulse of waveform 120 to comprise a leading edge 122 characterized by a voltage rise from a relatively lower voltage, corresponding to a first logic state, to a relatively higher voltage, corresponding to a second logic state. Because the specific integrated circuit 104 requires proper addressing before data can be loaded into it, address data is loaded into the address decoder in response to a leading edge 122 to enable it to receive data for its shift register. Data is entered into the shift register while the Chip enable signal pulse remains in the second logic state, the data being clocked serially into the shift register by Clock signal pulses. The Chip enable signal pulse terminates in a trailing edge 124 with the signal reverting to the first logic state. Occurrence of the trailing edge causes data in the shift register of integrated circuit 104 to be latched in its latch and appear at the output device where it is available to a load, to be described.

FIG. 3 shows a single pulse of a waveform 130 which is applied to input STR of integrated circuit 102 and which is generated in interface circuit 106 in response to the trailing edge 124 of waveform 120. Waveform 130 is developed by circuit 106 from the waveform 120. The illustrated pulse of waveform 130 comprises a leading edge 132 characterized by a voltage rise from a relatively lower voltage, corresponding to the first logic state, to a relatively higher voltage, corresponding to the second logic state. The protocol of integrated circuit 102 requires that the signal at its STR terminal be in the first logic state in order for data in its shift register not to be transferred to its storage register and from there to the load at its outputs. Hence, data is loaded into both integrated circuits 102 and 104 during the span of the pulse of waveform 120, being clocked serially into the shift registers by Clock signal pulses. In other words, the microprocessor sends serial data through integrated circuit 102 such that both integrated circuits 102 and 104 received their last bit of serial data at the same clock pulse, and both may then be latched simultaneously.

The protocol of integrated circuit 102 requires that the signal at its STR terminal be in the second logic state in order for data in its shift register to be transferred to its storage register. Hence, leading edge 132 occurs in response to the trailing edge of the pulse of waveform 120, and when the pulse assumes the second logic state, the data transfer occurs and is available to a load connected to integrated circuit 102. The pulse terminates in a trailing edge 134, with the waveform reverting to the first logic state. Occurrence of the trailing edge causes data in the shift register to be latched in the storage register and appear at the output device where it is available to the load connected to it.

Circuit 106 operates as follows. When the second logic state immediately following leading edge 122 of a pulse of waveform 120 occurs, transistor Q4 is suddenly rendered non-conductive. Capacitor C16 begins to discharge through resistor R84 and D11. During this discharge cycle, D11 prevents the voltage across R87 from dropping below the requirements of the STR input of integrated circuit 102. Although leading edge 122 has no effect on the logic signal being applied to terminal STR, diode D11 is available to limit how far down the voltage applied to terminal STR can be pulled below the VSS voltage, thereby avoiding potentially overstressing integrated circuit 102. Diode D11 will limit the voltage at TP48 to approximately −0.7 volts. As demonstrated in FIG. 3, circuit 106 inhibits the leading edge 122 from having any effect on the STR input of integrated circuit 102. When the first logic level occurs immediately following trailing edge 124 of the pulse of waveform 120, transistor Q4 is suddenly rendered conductive, thereby pulling up its collector voltage. This creates a fast rise of voltage from the first logic state to the second logic state at the collector of transistor Q4. This sudden voltage rise is coupled through capacitor C16 to terminal STR of integrated circuit 102, initiating a pulse of waveform 130. Circuit 106 proceeds to execute a transient RC timing function that determines the pulse duration. The voltage at TP48 discharges over time from the second logic state to the first logic state through resistor R87 based on a time constant set by the combination of C16 and R87, eventually settling at zero volts. The transient concludes before any more data is clocked into the integrated circuit.

Circuit 106 is tuned such that the capacitively coupled voltage at TP48 remains above the specified input high voltage for a certain minimum pulse width of a pulse of waveform 130 specified by the integrated circuit manufacturer beyond worst case tolerances, and voltage at TP48 has discharged below specified low input voltage before new data is clocked through.

A specific circuit usage for circuit 100 is in an automatic climate control module of an automotive vehicle. The output device of integrated circuit 102 controls LED's on the face of the module to indicate status of certain functions and/or variables. The output device of integrated circuit 104 controls a vacuum fluorescent display that provides information related to operation of the module.

The inventive circuit provides several advantages. The number of microcontroller outputs required for control lines to the I.C.'s is minimized. Required printed circuit board area is reduced because of the minimized number of traces. Fewer individual conductors are needed between remotely located devices. Cascading the shift registers of the two I.C.'s 102, 104 enables the use of a single data conductor from a microcontroller.

The following steps describe an exemplary method for shifting ninety-two bits of display data for integrated circuit 104 and twelve bits of LED data for integrated circuit 102.

1) Hold the chip enable line low;
2) Clock in the address of integrated circuit 104, using Clock signal pulse width and frequency suitable for both integrated circuits;
3) Clock in the next twelve bits of display data, thereby forcing the display address into address decoder 104A;
4) Pull the chip enable line high to decode the address;
5) Clock in the remaining display data;
6) Clock in the data for integrated circuit 102, $11^{th}$ bit first and $0^{th}$ bit last; and
7) Pull the chip enable line low to latch the data to both integrated circuit output registers.

The chip enable should remain low until the next display mode LED cycle.

While a presently preferred embodiment has been illustrated and described, it is to be appreciated that the invention may be practiced in various forms within the scope of the following claims. For example, the inventive principles may be applied to integrated circuits, similar to integrated circuit 102, that utilize either a leading edge 132, a trailing edge 134, or a first logic level (low) for transferring data out of the shift register into the storage register, instead of the second (high) logic level. In addition, it may be applied to integrated circuits similar to integrated circuit 104 that utilize a non-addressable or addressable version of the C2B protocol. Also various specific circuit configurations for interface circuit 106 are contemplated. Finally, it should be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. An electronic circuit comprising:
    discrete first and second integrated circuits each having a respective command protocol diverse from that of the other;
    the first integrated circuit (102) having a clock input, a strobe input, a data input, a shift register, and an output register;
    the second integrated circuit (104) having a clock input, a chip enable input, a data input, a register, and an address decoder;
    a clock signal source for supplying a clock signal comprising clock pulses to the clock inputs of the integrated circuits via a clock line;
    a data signal source for supplying a serial data signal to the data inputs of the integrated circuits via a data line;
    a chip enable signal source for supplying to the chip enable input of the second integrated circuit a chip enable signal comprising chip enable pulses that have leading edges defining change from a first logic state to a second logic state and trailing edges defining change from the second logic state to the first logic state;
    the second integrated circuit's command protocol allowing serial data at its data input to be clocked in by clock pulses at its clock input when the chip enable signal is in the second logic state after the address decoder has detected that the second integrated circuit has been correctly addressed by data preceding the data that is to be entered in the second integrated circuit's register, and disallowing serial data at its data input from being clocked in by clock pulses at its clock input either when the chip enable signal is in the first logic state or when the address decoder has failed to detect correct addressing of the second integrated circuit;

an interface circuit (106) interfacing the chip enable signal to the strobe input of the first integrated circuit and supplying to the strobe input a strobe signal comprising pulses that have leading edges defining change from the first logic state to the second logic state and trailing edges defining change from the second logic state to the first logic state;

the first integrated circuit's command protocol allowing serial data at its data input to be clocked into its shift register by clock pulses at its clock input and transfer of the data from its shift register to its output register when the strobe signal is in the second logic state, and disallowing transfer of the data from its shift register to its output register when the strobe signal is in the first logic state; and in response to change in the chip enable signal from the first logic state to the second logic state, the interface circuit causes the strobe signal to remain in the first logic state, and in response to change in the chip enable signal from the second logic state to the first logic state, the interface circuit causes the strobe signal to change from the first logic state to the second logic state, and then after a delay time, change back to the first logic state.

2. An electronic circuit as set forth in claim 1 in which the first integrated circuit further comprises a data latch connected to its output register and having plural data outputs at which latched data is presented, and data in the output register is latched in the data latch when the chip enable pulse changes from the second logic state to the first logic state.

3. An electronic circuit as set forth in claim 2 in which the register of the second integrated circuit comprises a shift register, the second integrated circuit further includes a data latch, and data loaded into the shift register of the second integrated circuit state is latched in its data latch when the chip enable signal changes from the second logic state to the first logic state.

4. An electronic circuit as set forth in claim 3 in which the first logic state is defined by a relatively lower magnitude voltage, and the second logic state is defined by a relatively higher magnitude voltage.

5. An electronic circuit as set forth in claim 1 in which the first logic state is defined by a relatively lower magnitude voltage, and the second logic state is defined by a relatively higher magnitude voltage.

6. An electronic circuit as set forth in claim 1 in which the interface circuit comprises an input and output, the chip enable signal comprises rectangular voltage pulses applied directly to the chip enable input of the second integrated circuit and to the input of the interface circuit, and the output of the interface circuit provides the strobe signal as strobe pulses to the strobe input of the first integrated circuit.

7. An electronic circuit as set forth in claim 6 in which the interface circuit comprises an RC timing circuit providing the delay time, and a voltage limiter between the RC timing circuit and the output of the interface circuit.

8. An electronic circuit as set forth in claim 1 in which the first integrated circuit shift register has a serial data output at which data that has been clocked through the shift register is serially output, and further including a connection from the data output of the first integrated circuit to the data input of the second integrated circuit so that data from the data signal source is presented to the second integrated circuit only after having been clocked through the shift register of the first integrated circuit.

9. An electronic circuit as set forth in claim 8 in which the register of the second integrated circuit comprises a shift register into which data supplied from the data output of the shift register of the first integrated circuit to the data input of the second integrated circuit is clocked.

10. An electronic circuit as set forth in claim 1 in which the first integrated circuit, the second integrated circuit, and the interface circuit are disposed on a common circuit board, the clock signal source, the data signal source, and the chip enable signal source are not disposed on that common circuit board, and a clock signal line connects the clock signal source to the common circuit board, a data signal line connects the data signal source to the common circuit board, and a chip enable signal line connects the chip enable signal source to the common circuit board.

11. An electronic circuit as set forth in claim 10 in which the clock signal source, the data signal source, and the chip enable signal source are disposed on a common second circuit board.

12. An electronic circuit as set forth in claim 10 in which the first integrated circuit shift register has a data output at which data that has been clocked through the shift register is serially output, the data signal line connects to the serial data input of the first integrated circuit shift register, and further including a connection from the data output of the first integrated circuit to the data input of the second integrated circuit so that data from the data signal source is presented to the second integrated circuit only after having been clocked through the shift register of the first integrated circuit.

13. An electronic circuit as set forth in claim 12 in which the register of the second integrated circuit comprises a shift register into which data supplied from the data output of the shift register of the first integrated circuit to the data input of the second integrated circuit is clocked.

14. An electronic circuit comprising:

discrete first and second integrated circuits each having a respective command protocol diverse from that of the other;

the first integrated circuit (102) having a clock input, a strobe input, a data input, a shift register, and a serial data output;

the second integrated circuit (104) having a clock input, a chip enable input, and a data input;

a clock signal source for supplying a clock signal comprising clock pulses to the clock inputs of the integrated circuits;

a data signal source for supplying a serial data signal to the data input of the first integrated circuit;

a chip enable signal source for supplying to the chip enable input of the second integrated circuit a chip enable signal;

an interface circuit (106) interfacing the chip enable signal to the strobe input of the first integrated circuit for supplying to the strobe input a strobe signal derived from the chip enable signal;

said serial data output receiving data that has been clocked through the shift register after entering at the first integrated circuit's data input, and serially outputting said data;

a connection from the data output of the serial data output of the shift register to the data input of the second integrated circuit so that data from the data signal source is presented to the second integrated circuit only after having been clocked through the shift register; and in which the first integrated circuit, the second integrated circuit, and the interface circuit are disposed on a common circuit board, the clock signal source, the data signal source, and the chip enable signal source are not disposed on that common circuit board, and a clock signal line connects the clock signal source to the common circuit board, a data signal line connects the data signal source to the common circuit board, and a chip enable signal line connects the chip enable signal source to the common circuit board.

15. An electronic circuit as set forth in claim 14 in which the clock signal source, the data signal source, and the chip enable signal source are disposed on a common second circuit board.

* * * * *